United States Patent [19]

Noda

[11] Patent Number: 4,748,584
[45] Date of Patent: May 31, 1988

[54] PARALLEL MULTIPLIER UTILIZING BOOTH'S ALGORITHM

[75] Inventor: Makoto Noda, Yokohama, Japan

[73] Assignee: Kabushiki Kaisha Toshiba, Kawasaki, Japan

[21] Appl. No.: 729,661

[22] Filed: May 2, 1985

[30] Foreign Application Priority Data

May 9, 1984 [JP] Japan .................................. 59-92449

[51] Int. Cl.$^4$ .............................................. G06F 7/52
[52] U.S. Cl. ...................................................... 364/760
[58] Field of Search ......................................... 364/760

[56] References Cited

U.S. PATENT DOCUMENTS 4,153,938  5/1979  Ghest et al. ......................... 364/760
4,168,530  9/1979  Gajski et al. ........................ 364/760
4,575,812  3/1986  Kloker et al. ........................ 364/760

OTHER PUBLICATIONS

Japanese Patent Publication (KOKOKU), No. 57-28129.
Review on a Multiplier Circuit System Using a Parallel Operation System of a Now Progressing LSI Version, Nikkei Electronics; pp. 76-89, esp. p. 84, May 29, 1978.

*Primary Examiner*—David H. Malzahn
*Attorney, Agent, or Firm*—Finnegan, Henderson, Farabow, Garrett & Dunner

[57] ABSTRACT

The basic cells of a parallel multiplier are arranged into arrays corresponding in number to the number of bits of multiplier data Y and multiplicand data X. Multiplicand data supply lines supply bit data $X_i$ corresponding to the basic cell of the multiplicand data X, its inverted data $\overline{X_i}$, bit data $X_{i-1}$ one digit lower than said corresponding bit, and its inverted data $\overline{X_{i-1}}$ to each of the basic cells. Decoders decode multiplier data Y based on the Booth's algorithm. These decoders supply a prescribed select signal to the basic cells. The basic cells comprise a selecting circuit for selectively inputting one of data $X_i$, $\overline{X_i}$, $X_{i-1}$, $\overline{X_{i-1}}$ and "0" according to the select signal from the decoders, and a full adder. The full adder receives the data input by the selecting circuit as the augend data and receives the addend and carry data from the previous row of basic cells. The full adder adds the augend, addend and carry data, and outputs sum and carry data.

9 Claims, 4 Drawing Sheets

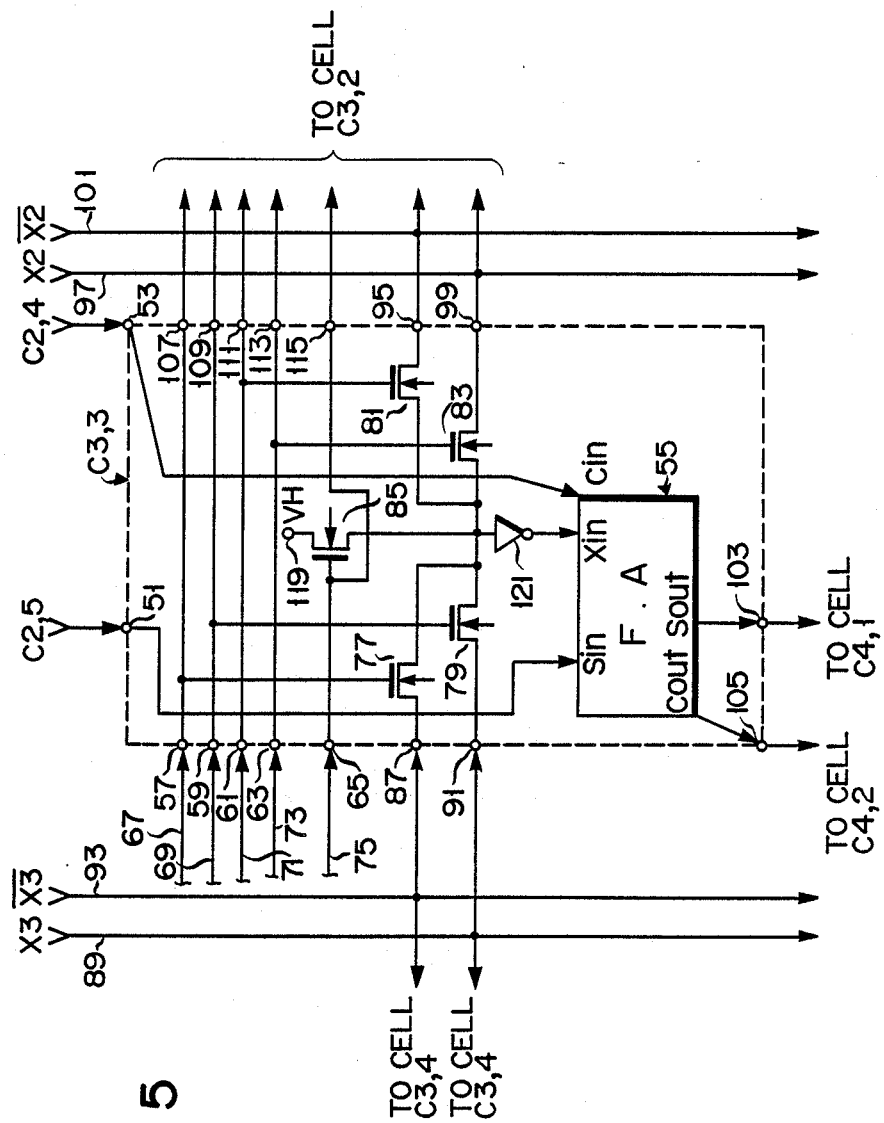
F I G. 5

PARALLEL MULTIPLIER UTILIZING BOOTH'S ALGORITHM

BACKGROUND OF THE INVENTION

This invention relates generally to an improvement in a binary parallel multiplier, and in particular, to a parallel multiplier based on modified Booth's algorithms.

Various systems have been proposed for increasing the speed of binary parallel multipliers. An example is described in COMPUTER ARITHMETIC 1979, p129–211, John Wiley & Sons Co. and NIKKEI ELECTRONICS, May 29, 1978, P76–89.

The following is a description of a prior art parallel multiplier which is based on modified Booth's algorithms. Modified Booth's algorithms are known as one method of speeding up multiplication. These algorithms are described in detail in the above publications so a description has been omitted.

One example of the structure of the basic cell of a prior art parallel multiplier which is based on modified Booth's algorithms is shown in FIG. 1. The basic cell shown here has the same structure shown in FIG. 2 of Japan Patent Disclosure Sho 57-28129.

Data Xi, which is the ith bit of multiplicand X, is input to basic cell 1 via input terminal 3. The ith bit corresponds to the position of cell 1 of multiplicand X. Data Xi-1 which is one bit lower than Xi is input to basic cell 1 via terminal 5. Select signals S(X) and S(2X) are input via terminals 7 and 9. Data Xi and select signal S(X) are input to first AND gate 11. And data Xi-1 and select signal S(2X) are input to second AND gate 13. The output signals of these AND gates 11, 13 are input to OR gate 15, whose output signal is supplied to one of the input terminals of EXCLUSIVE OR gate 17. Control signal INV is input to the other input terminal of EX OR gate 17 via terminal 19. The output signal of EX OR gate 17 is input to the full adder 21 to which the sum of the full adder of the basic cell of the same digit in the previous row is also input via terminal 23. The carry data of the full adder one digit lower is input via terminal 25.

First and second AND gates 11, 13, and OR gate 15 form a 2-input 1-output selector. When select signal S(X) is at a high level, this selector outputs data Xi, and when select signal S(2X) is at a high level, data Xi-1 is output. When control signal INV is at a high level, EX OR gate 17 inverts the output of this selector and supplies it to full adder 21. When control signal INV is at a low level EX OR gate 17 supplies the selector output to full adder 21 without inversion. Full adder 21 outputs the sum and carry data via terminals 27 and 29, respectively.

Select signals S(X), S(2X) and control signal INV are obtained based on the following equation (1)–(3).

$$S(X) = y2i\text{-}2 \oplus y2i\text{-}1 \quad (1)$$

$$S(2X) = \overline{y2i \cdot y2\text{-}1} \cdot y2i\text{-}2 + \overline{y2i} \cdot \overline{y2i\text{-}1} \cdot y2i\text{-}2 \quad (2)$$

$$INV = y2i \quad (3)$$

where $\oplus$ is exclusive OR, . is AND, and + is OR. Data y2i, y2i-1, y2i-2 are the continuous 3-bit data of the 2ith bit, 2i-1 bit, and 2i-2 bit of multiplier Y, and i is a positive integer.

As is generally known, parallel multipliers based on secondary Booth's algorithms have half the number of basic cell rows and half the number of cells used compared to conventional parallel multipliers. However, the number of transistors which comprise the basic cells is increased. For example, eighteen transistors are used in the input section (multiplicand control section) other than that for the full adder. Namely, if it is assumed that EX OR gate 17 is constructed of compound gate 37 (broken line 31 of FIG. 2), which comprises AND gate 33 and NOR gate 35, and NOR gate 39, ten MOS transistors are required. If compound gate 41 comprising AND gates 11, 13 as the 2 to 1 selector, and NOR gate 16 is used, eight transistors are required.

Consequently, a parallel multiplier using basic cells such as that shown in FIG. 1 has the following drawbacks: (1) Many transistors are used in each basic cell, increasing the size of the cell and decreasing integration density, which results in a large multiplier; (2) The large number of transistors increases the power consumption; (3) High integration is not possible so productivity is poor and the chip size increases; (4) Poor productivity and large chips mean a high cost multiplier; and (5) The wiring between basic cells is lengthened resulting in long signal propagation times. Also, because many transistors are used in the control section the propagation time of the multiplicand data is long resulting in slow computation speed.

SUMMARY OF THE INVENTION

The purpose of this invention is to provide an efficient parallel multiplier in which few MOS transistors are used in the multiplicand input control section of the basic cell, and which has higher computation speed.

The parallel multiplier of this invention comprises:
  basic cells corresponding to the number of multiplicand and multiplier data bits, and arranged in arrays;
  multiplicand data supply means for supplying the bit data Xi, which correspond to the basic cell of the multiplicand, its inverted data $\overline{Xi}$, and bit data Xi-1, which are one bit lower than said corresponding bit of each basic cell and its inverted data $\overline{Xi\text{-}1}$
  decoder means for decoding multiplier data based on a specific logic formula, and supplying a specific selection control signal to the basic cells;
  said basic cells each comprising means for selectively inputting as the multiplicand data one of either said data Xi, $\overline{Xi}$, Xi-1, $\overline{Xi\text{-}1}$ or "0" data supplied from said multiplicand data supplying means, and a full adder, which receives data input from said selective input means as the augend data, receives the sum data from the basic cell of the same digit as the basic cell in the previous stage of said arrayed basic cells, receives carry data from the basic cell of one digit lower than the basic cell of said previous stage, adds said augend data, sum data and carry data, and outputs sum data and carry data corresponding to the addition result.

In the past, the inverted data ($\overline{Xi}$) of the bit corresponding to the basic cell of the multiplicand data and the inverted data ($\overline{Xi\text{-}1}$) of the bit which is one bit lower than this corresponding bit were generated in the basic cells. With the parallel multiplier of this invention, on the other hand, these data are supplied to the basic cells from the outside. Consequently, the structure of the selective input means of the basic cells of this invention are simpler than that in the prior art. Accordingly, the number of transistors required can be reduced, the size of the basic cells is reduced, high integration is possible, increasing productivity, power consumption can be reduced as well as the cost of the parallel multiplier. The wiring between cells can also be shortened, decreasing signal propagation time and improving the speed of the computation.

BRIEF DESCRIPTION OF THE DRAWINGS

FIG. 5 is a circuit diagram of a basic cell according to another embodiment of this invention.

DETAILED DESCRIPTION OF THE PREFERRED EMBODIMENTS

The following is a detailed description in conjunction with the drawings of the parallel multiplier based on the modified Booth's algorithm according to preferred embodiment of this invention.

The modified Booth's algorithm that is used is shown in Equation (4).

$$X \cdot Y = X \cdot \sum_{i=1}^{n/2} (y2i - 2 + y2i - 1 - 2 \cdot y2i) \cdot 2^{2i} \quad (4)$$

Figure 1:
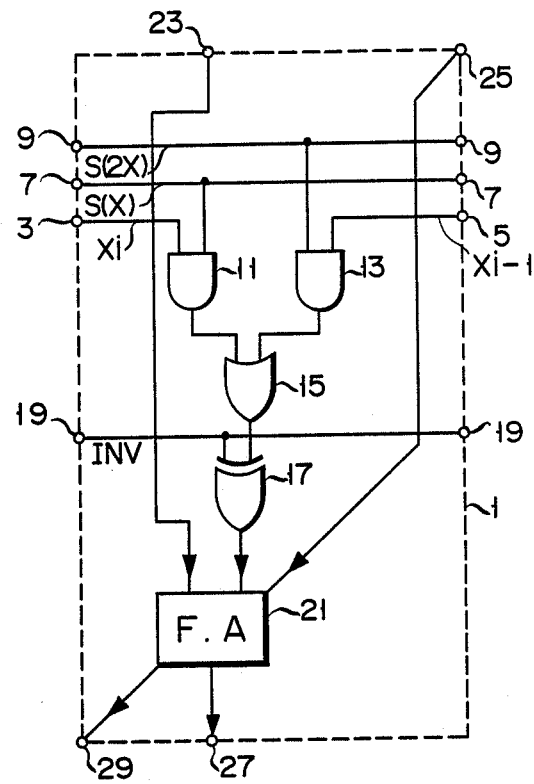
FIG. 1 is a circuit diagram of a prior art basic cell.
Figure 2:
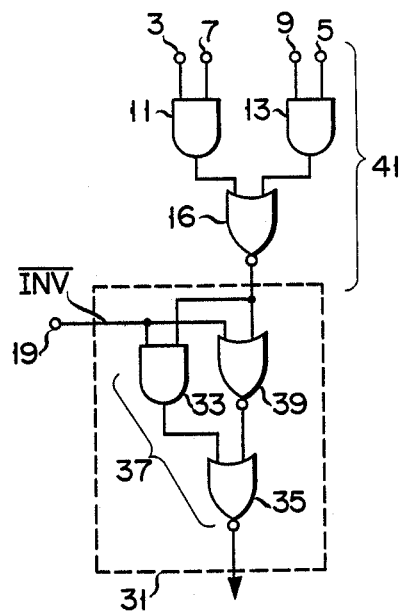
FIG. 2 is a detailed circuit diagram of the control section shown in FIG. 1.
Figure 3:
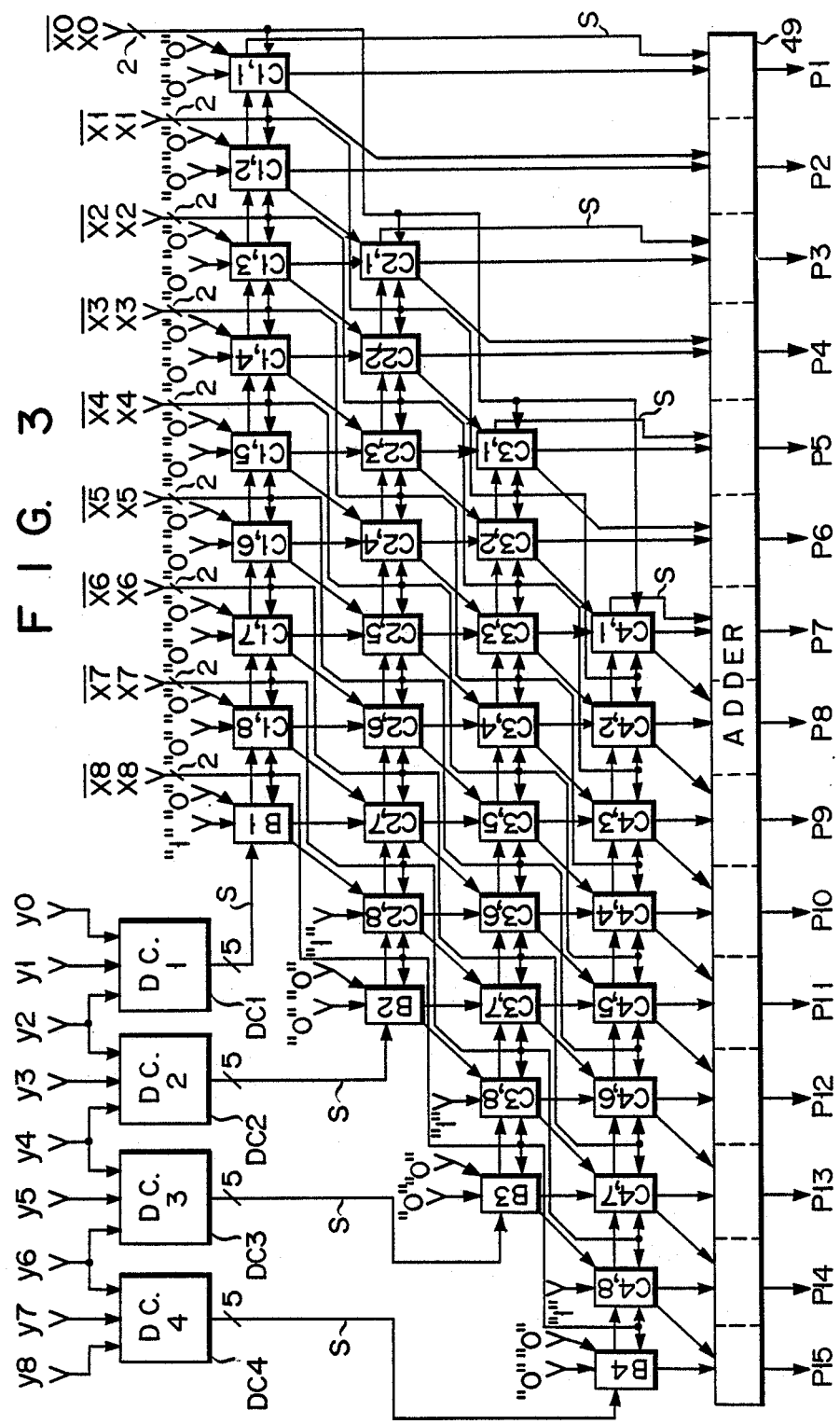
FIG. 3 is a circuit diagram of a parallel multiplier according to the first embodiment of this invention.

The parallel multiplier shown in FIG. 3 has an 8-bit multiplier Y and 8-bit multiplicand X structure. In data X, the first bit is LSB, the seventh bit is MSB, and the eighth bit is the sign bit. Eight basic cells corresponding to the eight bits of the multiplicand data are arranged in each of four rows. A cell B for sign processing is provided in the most significant position of each row. The k bit of the multiplicand X, data Xk, Xk-1 of the (k-1) bit and their inverted data $\overline{Xk}$, $\overline{Xk-1}$ are input to the kth cell Ci,k. There is no corresponding k-1 bit in the first basic cells (C1,1, C2,1, C3,1, C4,1) and, consequently, "0" data X0 and "1" data $\overline{X0}$ is supplied as the 0th bit data.

Each basic cell receives the sum data SD from the basic cell in the previous row which is one digit lower. Also, each cell receives the carry data from the basic cell in the previous row which is one digit lower. Namely, cell Ci,k receives sum data SD from cell Ci-1,k+2 and carry data CD from cell Ci-1,k+1. However, "0" data is supplied to the first row of basic cells C1,k as the sum data SD and carry data CD because a previous row of cells does not exist for them. "1" data is supplied to cells C2,8, C3,8, C4,8 as the sum data SD. The reason for this is that in the modified Booth's algorithm, it is necessary to expand the sign bit for each partial product. When the input data is set in this way, it is not necessary to increase the number of cells. (See DIGITAL CIRCUITS FOR BINARY ARITHMETIC, p 156 to 157, R.M.M Oberman, 1979, The Machillan Press Co., Ltd.) Also, "0" data is supplied to the other terminal of sign processing cell B. The cells of the same digit have outputs of equal weight.

Multiplier data Y is input to the ith decoder DCi every 3 consecutive bits of 2i, 2i-1, 2i-2 (i is a positive integer). The ith decoder DCi decodes input data y2i, y2i-1, y2i-2 according to logic equations (5) to (9) and, based on this decoding result, inputs the first to fifth select signals S(X), S(-X), S(2X), S(-2X), S(Z) to the i row of basic cells Ci,k and sign processing cells B.

$$S(X) = \overline{y2i} \cdot (y2i-1 \oplus y2i-2) \quad (5)$$

$$S(-X) = \overline{y2i} \cdot (y2i-1 \oplus y2i-2) \quad (6)$$

$$S(2X) = \overline{y2i} \cdot \overline{y2i-1} \cdot y2i-2 \quad (7)$$

$$S(-2X) = y2i \cdot \overline{y2i-1} \cdot \overline{y2i-2} \quad (8)$$

$$S(Z) = \overline{y2i} \cdot \overline{y2i-1} \cdot y2i-2 + y2i \cdot y2i-1 \cdot \overline{y2i-2} \quad (9)$$

where $\oplus$ is EX OR, . is AND and + is OR

With a modified Booth's algorithm, the signal S(X) going to high level indicates addition of the multiplicand data X, signal S(-X) going to high indicates addition of inverted data $\overline{X}$ of multiplicand X, signal S(2X) going to high indicates addition of multiplicand X and data 2.X, which has been shifted by one bit, signal S(-2X) going high indicates addition of inverted data $\overline{2.X}$ of data 2.X, and signal S(Z) going high indicates addition of data "0".

The first row of basic cells C1,k find the first partial product in the modified Booth's algorithm. The second row of cells C2,k add the second partial product and the first partial product. The third row of cells C3,k add third partial product and the outputs of the second row of cells C2,k. The fourth row of cells C4,k adds the fourth partial product and the outputs of the third row of cells C3,k. The sum and carry outputs of basic cells C1,1, C2,1, C3,1 and the sum outputs of cells C1,2, C2,2, C3,2 and the sum and carry outputs of row 4 cells C4,k are input to the last adder 49. However, other than the sum data SD from the least significant digit cell Ci,1, the output signals of decoder DC1 to DC4 are input to adder 49. The reason for this is that when two's complement is added to the cells of each row, adder 49 adds "1" to the corresponding bit. Namely, adder 49 determines the OR value of select signals S(-X), S(-2X) and adds the result to the corresponding bit. It is also possible to determine the OR value before it is input to the adder. This final adder 49 outputs 15-bit data P1–P15 (P15 is a sign bit), which becomes the multiplication output of the parallel multiplier.

Figure 4:
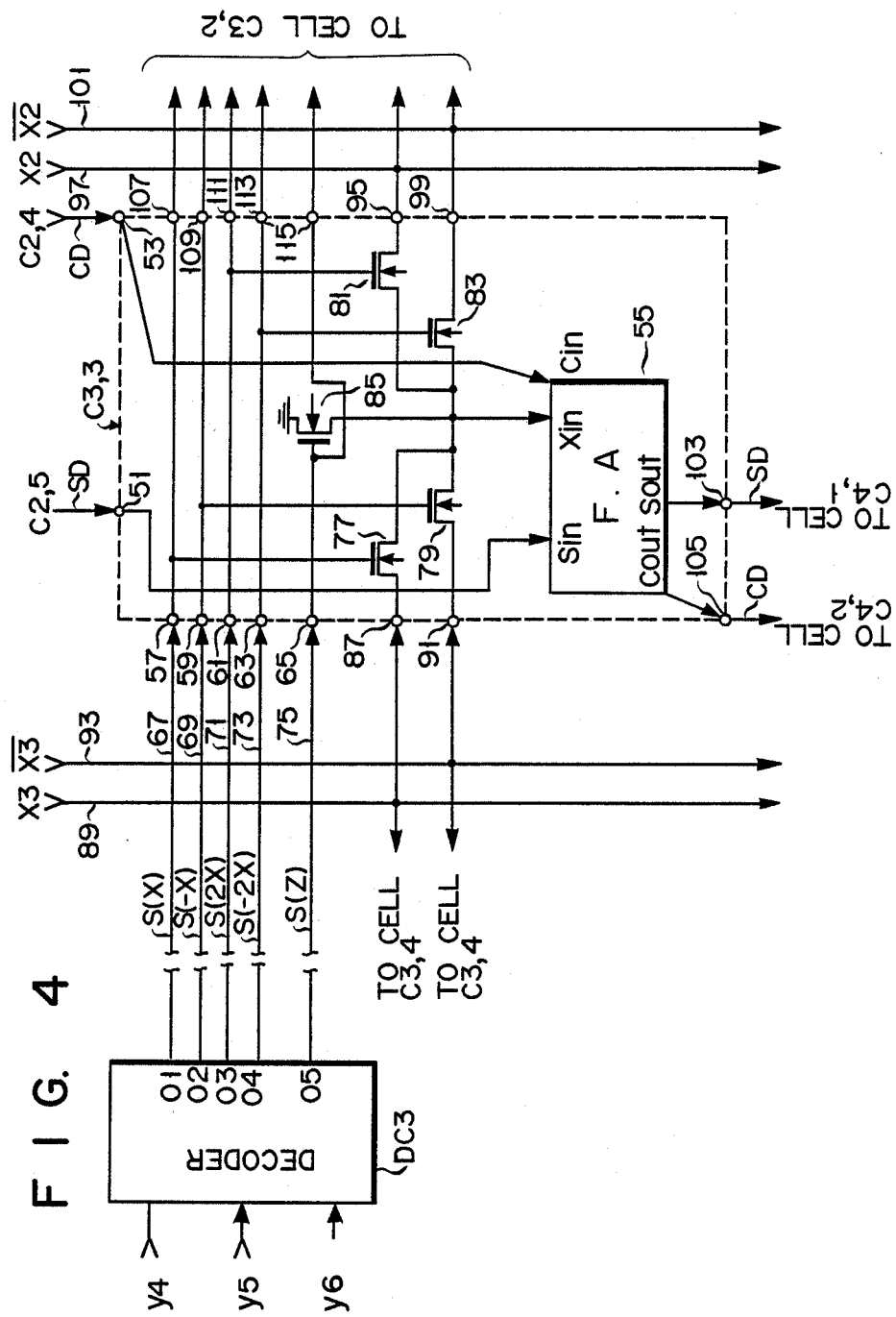
FIG. 4 is a circuit diagram of one example of the basic cell structure of the parallel multiplier shown in FIG. 3.

The following is a description in conjunction with FIG. 4 of the structure of the basic cell using cell C3,3 as an embodiment. The first input terminal 51 of basic cell C3,3 is connected to the first output terminal of basic cell C2,5 which is positioned at the same digit on the row previous to cell C3,3. First input terminal 51 is also connected to the add input terminal Sin of full adder 55, and the second input terminal 53 is connected to the second output terminal of cell C2,4 which is one digit lower. Second input terminal 53 is also connected to the carry input terminal Cin of full adder 55.

The first to fifth output terminal 01–05 of the third decoder DC3 are connected to the first to fifth select signal input terminals 57, 59, 61, 63, 65 of basic cell C3,3 by signal lines 67, 69, 71, 73, 75 (via adjacent cell C3,4), and to adjacent cell C3,2 (via first to fifth select signal output terminals 107, 109, 111, 113, 115). Accordingly, the select signals are also sent to adjacent cell C3,2. As was explained earlier, with the least significant cell Ci,1, these signals are input to adder 49. The first select signal input terminal 57 is connected to the gate of the first transmission gate 77. Similarly, the second select signal input terminal 59 is connected to the gate of the second transmission gate 79. The third select signal input terminal 61 is connected to the gate of the third transmission gate 81, the fourth select signal input terminal 63 is connected to the gate of the fourth transmission gate 83, and the fifth input terminal 65 is connected to the gate of the fifth transmission gate 85. One end of each current path of these transmission gates is connected to the multiplicand input terminal of full adder 55. The other end of the current path of the first transmission gate 77 is connected to terminal 87, which is connected to data input line 89. Data input line 89 supplies data X3 to basic cells connected to this line. The other end of the current path of the second transmission gate 79 is connected to terminal 91, which is connected to data input line 93. Data input line 93 supplies data $\overline{X3}$ to the basic cells connected to this line. The other end of the current path of the third transmission gate 81 is connected to terminal 95, which is connected to data input line 97. Data input line 97 supplies data X2 to the basic cells connected to this line. The other end of the current path of the fourth transmission gate 83 is connected to terminal 99, which is connected to data input line 101. Data input line 101 supplies data $\overline{X2}$ to the basic cells connected to this line. A ground level voltage is applied to the other end of the fifth transmission gate 85.

Sum data output terminal Sout of full adder 55 is connected to the first output terminal 103, which is connected to the first input terminal of the basic cell C4,1 of the same digit on a later row. The carry output terminal Cout of full adder 55 is connected to second output terminal 105, which is connected to the second input terminal of cell 4,2 which is one digit higher on the later row. With basic cells C1,1-C1,8, which do not have a previous row, "0" is input to the corresponding input terminals 51, 53.

The following is a description of the operation of a parallel multiplier according to the preferred embodiment of this invention. Using FIG. 4, the operation of each part is described with the operation of cell C3,3 taken as the center.

The third decoder DC3 decodes input data y4, y5, y6 based on equations 5 to 9. Data y4, y5, y6 are the fourth, fifth and sixth bit data of the multiplier data. Decoder DC3 outputs the first to fifth select signals S(X), S(-X), S(2X), S(-2X), S(Z), which correspond to the result of this decoding, and one of which is at the active level.

When first select signal S(X) is active, first transmission gate 77 is turned ON. Consequently, data X3 of the third bit of multiplicand X is input to multiplicand input terminal Xin of full adder 55. When the second select signal S(-X) becomes active, the second transmission gate 79 is turned ON. Consequently, the inverted data $\overline{X3}$ is input to multiplicand data input terminal Xin. When the third select signal S(2X) becomes active, the third transmission gate 81 is turned ON. Consequently, the second bit data X2 is input to multiplicand data input terminal Xin. When the fourth select control signal S(-2X) becomes active, the fourth transmission gate 83 is turned ON. Consequently, the inverted data $\overline{X2}$ is input to multiplicand data input terminal Xin. When the fifth select control signal S(Z) becomes active, the fifth transmission gate 85 is turned ON. Consequently, the data "0" is input to multiplicand data input terminal Xin. That is, one of data X3, $\overline{X3}$, X2, $\overline{X2}$ and 0 is input to input terminal Xin. Accordingly, when data y4 is 0 data y5 is 0, and data y6 is 1, the fourth select signal S(-2x) is level 1 (active level). Consequently, fourth transmission gate 83 is ON and data $\overline{X2}$ is input to augend input terminal Xin. Namely, the inverted data of multiplicand X that has been shifted up one bit is added, in this case. Full adder 55 adds augend data, the carry data CD and sum data SD that were input and outputs sum data SD and carry data CD. In the other basic cells, as well, augend data corresponding to the select signals is input and the augend data is added to the sum data SD and carry data CD.

The following is a description of the operation of the parallel multiplier as a whole. For the purpose of description, multiplicand data X is taken to be 00110111 and the multiplier data is 00011001. The first decoder DC1 decodes data 010 and switches signal S(X) to high level. The second decoder DC2 decodes data 100 and switches signal S(-2X) to high level. The third decoder DC3 decodes data 011 and switches signal S(2X) to active level. The fourth decoder DC4 decodes data 000 and switches signal S(Z) to active level. Consequently, bit data Xi of the corresponding multiplicand data X is input to the first row of basic cells C1,i. Data "0" is also input as the sum data SD and carry data CD so these basic cells each add data Xi to "0". Namely, the first row of cells C1,i add data X (00110111) (first partial product) to data 00000000. Next, the inverted data $\overline{Xi-1}$ of the bit i-1, which is one digit lower than the corresponding bit, is input to the second row of basic cells C2,1. Namely, the second row of cells C2,i add the data (10010001) (second partial product) to the output of the first row of basic cells. Data $\overline{2X}$ (01101110) is input to the third row of basic cells C3,i and, accordingly, these cells add data 2X (01101110) (third partial product) to the output data of the second row of cells. The fourth row of cells C4,i add 00000000 to the output data of the third row of cells. The partial products determined by the basic cells of the first to fourth row are input to adder 49 and output as the final multiplication result 000010101011111.

A parallel multiplier constructed as described above, requires a mere five MOS transistors 77, 79, 81, 83, 85 for the multiplicand control section (5-input 1-output selector) of the basic cells C. This kind of parallel multiplier achieves the following effects compared to the prior art: 1) The size of the cells is reduced and, consequently, high integration is possible and the multiplier can be made compact; 2) Few transistors are used so power consumption can be reduced; 3) High integration makes improved yields possible. 4) The decrease in chip size and improvement of the yield reduces the cost of the multiplier; and 5) The decrease in the size of the cells means the wiring between cells can be shortened, which reduces the signal propagation time and increases the computation speed of the parallel multiplier.

This invention is not limited to the embodiment described and shown in FIG. 4. For example, the structural variation shown in FIG. 5 is also possible. In this variation the one end of each of the current paths of the first to fifth transmission gates 77, 79, 81, 83, 85 is connected in common to the input terminal of inverter 121. The output terminal of the inverter 121 is connected to multiplicand input terminal Xin of full adder 55. The other end of the current path of the first transmission gate 77 is connected to signal line 93. The other end of the current path of second transmission gate 79 is connected to signal line 89. The other end of the current path of third transmission gate 81 is connected to signal line 101 and the other end of the fourth transmission gate 85 is connected to signal line 97. The other end of the current path of the fifth transmission gate 85 is connected to the terminal 119 to which a high level voltage VH is applied.

Compared to the basic cell structure shown in FIG. 4, the signal level at the input terminals of inverter 121 is reversed. However, at the multiplicand input terminal of full adder 55 the signal level has the same relationship as that in FIG. 4. Accordingly, this structure is substantially the same as that in FIG. 4. In general when the transmitted signal passes the N-channel transmission gate, the voltage level drops by the amount of the threshold voltage of the N-channel MOS transistor. With the structure shown in FIG. 5, inverter 121 restores the signal level. It is also possible to give the multiplicand data input of full adder 55 driving capability. It is possible to construct inverter 121 using two MOS transistors so even with this inverter added the total number of MOS transistors for the multiplicand control section is seven. This represents a great decrease in the number of transistors compared to the prior art.

It is also possible to use P type MOS transistors as the transmission gates. In this case, the active levels of the select signals are inverted.

The above description of the preferred embodiments was for a 8-bit multiplier Y and 8-bit multiplicand X data. This invention is not limited to this, however, and the number of bits may be freely selected provided they satisfy the modified Booth's algorithm. For example, when the multiplier data is 6 bits, the basic cells are arranged in three rows. When the multiplier data is 10 bits, there are five rows of basic cells. When, for example, the multiplicand data is 6 bits, 6 basic cells are provided per row, and when the multiplicand is 10 bits, 10 basic cells are provided per row.

What is claimed is:

1. A parallel multiplier for providing a product of a multiplicand X and a multiplier Y having N bits and M bits, respectively, the bits of the multiplicand X and the mulitplier Y being ordered from a least to a most significant bit, the parallel multiplier comprising:
   a plurality of cells, each having a selecting means and a full adder, for adding addend, augend and carry data to obtain a partial product of the multiplicand X and the multiplier Y, the plurality of cells being arranged in a matrix of M/2 successive rows and N successive columns with each of the cells of a column corresponding to one of the N bits of the mulitplicand X;
   means, operatively connected to the plurality of cells, for supplying each of the cells of a column with the corresponding one of the N bits of the multiplicand X and with an inverted corresponding bit of the mulitplicand X and for supplying each of the cells of a column with the next less significant bit of the mulitplicand X and with an inverted next less significant bit of the mulitplicand X;
   decoder means, oepratively connected to the plurality of cells, for receiving the M bits of the multiplier Y and for decoding the M bits of the mulitplier Y to provide each of the cells of a row of the M/2 successive rows with select signals corresponding to that row;
   the selecting means of each cell of a row being responsive to the corresponding select signals from the decoder means and to the supply means to selectively provide to the full adder of the cell, as addend data, the corresponding one of the N bits of the multiplicand X, as addend data, the inverted corrsponding bit, the next less significant bit of the multiplicand X, the inverted next less significant bit of the mulitplicand X, and zero data;
   the full adder of each cell being responsive to the selecting means addend data, and to augend data from a cell in the previous one of the successive rows and in the same column, and carry data from a cell in the previous one of the successive rows and in a previous one of the successive columns and to predetermined data when no previous row exists, to obtain a partial product of augend data and carry data; and
   a final adder responsive to augend and carry data from the plurality of cells for providing a product of the multiplicand X and the multiplier Y.

2. The parallel mulitplier according to claim 1, wherein the decoder means comprises a plurality of decoder units and wherein each of the decoder units corresponds to a jth row of the M/2 successive rows of the matrix of the cells, j being a positive integer, the decoder unit corresponding to the jth row decoding (2j)th, (2j-1)th and (2j-2) th bits of the mulitplier Y to provide a first, second, third, fourth an fifth select signal to the cells of the jth row according to following Booth algorithm equations which specify select signal values in terms of the y bits of mulitplier Y:
   First select signal = $\bar{y}2j \cdot (y2j\text{-}1 \oplus y2j\text{-}2)$,
   Second select signal = $y2j \cdot (y2j\text{-}1 \oplus y2j\text{-}2)$,
   Third select signal = $\bar{y}2j \cdot y2j\text{-}1 \cdot y2j\text{-}2$,
   Fourth select signal = $y2j \cdot \bar{y}2j\text{-}1 \cdot \bar{y}2j\text{-}2$,
   Fifth select signal = $\bar{y}2j \cdot \bar{y}2j\text{-}1 \cdot \bar{y}2j\text{-}2 + y2j \cdot y2j\text{-}1 \cdot y2j\text{-}2$
where the symbols $\oplus$, ., and $+$ respectively represent EXCLUSIVE OR, AND and OR operations.

3. The parallel multiplier according to claim 2, wherein the full adder of each of the plurality of cells has an addend input terminal for receiving addend data, and wherein the selecting means selectively provides the corresponding one of the N bits of the mulitplicand X to the addend input terminal when the first select signal is active, selectively provides the inverted corresponding bit to the addend input terminal when the second select signal is active, selectively provides the next less significant bit of the N bits of the mulitplicand X to the adend input terminal when the third select signal is active, selectively provides the inverted next less significant bit to the addend input terminal when the fourth select signal is active, and selectively provides zero data to the input terminal when the fifth select signal is active.

4. The parallel mulitplier according to claim 3, wherein the selecting means of each of the cells comprises:
   means for providing zero data;
   a first transmission switch having a first gate operatively connected to the decoder to be turned on when the first select signal is active, and having a current path with a first end connected to the supply means to receive the corresponding bit of mulitplicand X, and a second end connected to the addend input terminal of the full adder, the corresponding bit being provided to the addend input terminal of the full adder through the current path when the first gate of the first transmission switch is turned on;
   a second transmission switch having a second gate operatively connected to the decoder means to be turned on when the second select signal is active, and having a current path with a first end connected to the supply means to receive the inverted corresponding bit, and a second end connected to the addend input terminal of the full adder, the inverted corresponding bit being provided to the addend input terminal of the full adder through the current path when the second gate of the second transmission switch is turned on;

a third transmission switch having a third gate operatively connected to the decoder means to be turned on when the third select signal is turned on, and having a current path with a first end connected to the supply means to receive the next less significant bit of the mulitplicand X, and a second end connected to the addend input terminal of the full adder, the next less significant bit of the multiplicand X being provided to the addend input terminal of the full adder through the current path when the third gate of the third transmission switch is turned on;

a fourth transmission switch having a fourth gate operatively connected to the decoder means to be turned on when the fourth select signal is active, and having a current path with a first end connected to the supply means to receive the inverted next less significant bit, and a second end connected to the addend input terminal of the full adder, the inverted next less significant bit being provided to the addend input terminal of the full adder through the current path when the fourth gate of the fourth transmission switch is turned on; and a fifth transmission switch having a fifth gate connected to the decoder means to be turned on when the fifth select signal is active, and having a current path with a first end connected to the means for providing zero data, and a second end connected to the addend input terminal of the full adder, the zero data being provided to the addend input terminal of the full adder through the current path when the fifth gate of the fifth transmission switch is turned on.

5. The parallel mulitplier according to claim 2, wherein the full adder of each of the plurality of cells has an addend input terminal for receiving addend data, and wherein the selecting means selectively provides the inverted corresponding bit of the mulitplicand X to the addend input terminal when the first select signal is active, selectively provides the corresponding bit to the addend input terminal when the second select signal is active, selectively provides the inverted next less significant bit of the multiplicand X to the addend input terminal when the third select signal is active, selectively provides the next less significant bit to the addend input terminal when the fourth select signal is active, and selectively provides a "1" data bit to the input terminal when the fifth select signal is active.

6. The parallel mulitplier according to claim 5, wherein the full adder further comprises addend input terminal inverter means disposed between the selecting means and the full adder input terminal for inverting the data selectively provided by the selecting means to supply the received addend data to the addend input terminal, and wherein the selecting means of each of the cells comprises:

means for providing a "1" data bit;

a first transmission switch having a first gate operatively connected to the decoder to be turned on when the first select signal is active, and having a current path with a first end connected to the supply means to receive the inverted corresponding bit of multiplicand X, and a second end connected to the addend input terminal inverter means of the full adder, the inverted corresponding bit being provided to the addend input terminal inverter means of the full adder through the current path when the first gate of the first transmission switch is turned on;

a second transmission switch having a second gate operatively connected to the decoder means to be turned on when the second select signal is active, and having a current path with a first end connected to the supply means to receive the corresponding bit of the mulitplicand X, and a second end connected to the addend input terminal of the full adder, the corresponding bit being provided to the addend input terminal of the full adder through the current path when the second gate of the second transmission switch is turned on;

a third transmission switch having a third gate operatively connected to the decoder means to be turned on when the third select signal is turned on, and having a current path with a first end connected to the supply means to receive the inverted next less significant bit of the mulitplicand X, and a second end connected to the addend input terminal inverter means of the full adder, the inverted next less significant bit of the mulitplicand X being provided to the addend input terminal inverter means of the full adder through the current path when the third gate of the third transmission switch is turned on;

a fourth transmission switch having a fourth gate operatively connected to the decoder means to be turned on when the fourth select signal is active, and having a current path with a first end connected to the supply means to receive the next less significant bit of mulitplicand X, and a second end connected to the addend input terminal inverter means of the full adder, the next less significant bit being provided to the addend input terminal of the full adder through the current path when the fourth gate of the fourth transmission switch is turned on; and a fifth transmission switch having a fifth gate connected to the decoder means to be turned on when the fifth select signal is active, and having a current path with a first end connected to the means for providing a "1" data bit, and a second end connected to the addend input terminal inverter means of the full adder, the "1" data bit being provided to the addend input terminal inverter means of the full adder through the current path when the fifth gate of the fifth transmission switch is turned on.

7. A parallel multiplier cell, for adding data to obtain partial products of a mulitiplicand X having N data bits ordered from a least to a most significant bit and mulitplier Y having M data bits, comprising:

a selecting means, having plurality of select signal receive terminals for receiving a plurality of select signals and an output terminal for selectively providing at the output terminal, a corresponding one of the N data bits of the mulitplicand X, an inverted corresponding bit of the multiplicand X, a next less sginificant bit of the mulitplicand X and an inverted next less significant bit of the mulitplicand X in accordance with the received select signals; and a full adder, having augend and carry data input terminals for receiving augend and carry data, and an addend data input terminal operatively connected to the output terminal of the selecting means, for obtaining a partial product of augend and carry data of the mulitplicand X and the multiplier Y in accordance with the data received at the augend, carry and addend data input terminals.

8. The parallel multiplier cell according to claim 7, wherein the selecting means of the cell further includes:
means for providing zero data;
a first transmission switch having a first gate for receiving a first select signal, the first gate being turned on when the first select signal is active, and having a current path for carrying the corresponding data bit to the output terminal when the first gate of the first transmission switch is turned on;
a second transmission switch having a second gate for receiving a second select signal, the second gate being turned on when the second select signal is active, and having a current path for carrying the inverted corresponding data bit to the output terminal when the gate of the second transmission switch is turned on;
a third transmission switch having a third gate for receiving a third select signal, the third gate being turned on when the third select signal is active, and having a current path for carrying the next less significant data bit of the multiplicand X to the output terminal when the third gate of the third transmission switch is turned on;
a fourth transmission switch having a fourth gate for receiving a fourth select signal, the fourth gate being turned on when the fourth select signal is active, and having a current path for carrying the inverted next less significant data to the output terminal when the fourth gate of the fourth tramsmission switch is turned on; and
a fifth transmission switch having a fifth gate for receiving a fifth select signal, the fifth gate being turned on when the fifth select signal is active, and having a current path for carrying the zero data from the means for providing the zero data signal to the output terminal when the fifth gate of the fifth transmission switch is turned on.

9. The parallel multiplier cell according to claim 7, wherein the selecting means further includes:
means for providing a "1" data bit;
a first transmission switch having a first gate for receiving a first select signal, the first gate being turned on when the first select signal is active, and having a current path for carrying the corresponding data bit of the multiplicand X to the output terminal when the first gate of the first transmission is turned on;
a second transmission switch having a second gate for receiving a second select signal, the second gate being turned on when the second select signal is active, and having a current path for carrying the corresponding data bit of the multiplicand X to the output terminal when the second gate of the second transmission switch is turned on;
a third transmission switch having a third gate for receiving a third select signal, the third gate being turned on when the third select signal is active, and having a current path for carrying the inverted next less significnat data bit of mulitplicand X to the output terminal when the third gate of the third transmission switch is turned on;
a fourth transmission switch having a fourth gate for receiving a fourth select signal, the fourth gate being turned on when the fourth select signal is active, and having a current path for carrying the next less significnat bit of the multilicand X to the output terminal when the fourth gate of the fourth transmission switch is turned on;
a fifth transmission switch having a fifth gate for receiving a fifth select signal, the fifth gate being turned on when the fifth select signal is active, and having a current path for carrying the "1" data bit from the means for providing the "1" data bit to the output terminal when the fifth gate of the fifth transmission switch is turned on; and
output terminal inverter means for inverting data at the selecting means output terminal to provide inverted output data to the full adder.

* * * * *

UNITED STATES PATENT AND TRADEMARK OFFICE
CERTIFICATE OF CORRECTION

PATENT NO. : 4,748,584

DATED : May 31, 1988

INVENTOR(S) : Makoto Noda

It is certified that error appears in the above-identified patent and that said Letters Patent is hereby corrected as shown below:

Claim 1, Column 7, Line 39, change "mulitiplier" to --multiplier--.

Claim 1, Column 7, Lines 48, 53, 55, 56, change "mulitplicand" to --multiplicand--.

Claim 1, Column 7, Line 57, change "oepratively" to --operatively--.

Claim 1, Column 7, Line 59 change "mulitplier" to --multiplier--.

Claim 1, Column 8, Line 1 change "corrsponding" to --corresponding--.

Claim 1, Column 8, Line 3 change "mulitplicand" --multiplicand--.

Claim 2, Column 8, Lines 16 and 26 change "mulitplier" to --multiplier--.

Claim 3, Column 8, Lines 39 and 44 change "mulitplicand" to --multiplicand--.

UNITED STATES PATENT AND TRADEMARK OFFICE
CERTIFICATE OF CORRECTION

PATENT NO. : 4,748,584
DATED : May 31, 1988
INVENTOR(S) : Makoto Noda

It is certified that error appears in the above-identified patent and that said Letters Patent is hereby corrected as shown below:

Claim 3, Column 8, Line 45 change "adend" to --addend--.

Claim 4, Column 8, Line 51 change "mulitplier" to multiplier--.

Claim 4, Column 8, Line 60, change "mulitplicand" to --multiplicand--.

Claim 4, Column 9, Line 14 change "mulitplicand" to --multiplicand--.

Claim 5, Column 9, Line 43 change "mulitplier" to --multiplier--.

Claim 5, Column 9, Line 47 change "mulitplicand" to --multiplicand--.

Claim 6, Column 10, Lines 17, 28, 31, and 41 change "mulitplicand" to --multiplicand--.

Claim 7, Column 10, Line 59 change "mulitplicand" to --multiplicand--.

UNITED STATES PATENT AND TRADEMARK OFFICE
CERTIFICATE OF CORRECTION

PATENT NO. : 4,748,584

DATED : May 31, 1988

INVENTOR(S) : Makoto Noda

It is certified that error appears in the above-identified patent and that said Letters Patent is hereby corrected as shown below:

Claim 7, Column 10, Line 60 change " mulitplier" to --multiplier--.

Claim 7, Column 10, Line 62 change "having plurality" to --having a plurality--.

Claim 7, Column 10, Line 66 change "mulitplicand" to --multiplicand--.

Claim 7, Column 10, Line 68 change "sginificant" to --significant--.

Claim 7, Column 10, Line 68 change "mulitplicand" to --multiplicand--.

Claim 7, Column 11, Line 1 change "mulitplicand" to --multiplicand--.

Claim 7, Column 11, Line 8 change "mulitplicand" to --multiplicand--.

Claim 8, Column 11, Line 39 change "tramsmission" to --transmission--.

UNITED STATES PATENT AND TRADEMARK OFFICE
CERTIFICATE OF CORRECTION

PATENT NO. : 4,748,584

DATED : May 31, 1988

INVENTOR(S) : Makoto Noda

It is certified that error appears in the above-identified patent and that said Letters Patent is hereby corrected as shown below:

Claim 9, Column 12, Line 25 change "significnat" to --significant--.

Claim 9, Column 12, Line 25 change "mulitplicand" to --multiplicand--.

Claim 9, Column 12, Line 32 change "significnat" to --significant--.

Claim 9, Column 12, Line 32 change "multilicand" to --multiplicand--.

Signed and Sealed this

Twenty-first Day of March, 1989

Attest:

DONALD J. QUIGG

*Attesting Officer*  *Commissioner of Patents and Trademarks*